United States Patent [19]
Belcher et al.

[11] Patent Number: 5,627,526
[45] Date of Patent: May 6, 1997

[54] PROXIMITY DETECTION USING DPSK WAVEFORM

[75] Inventors: Donald K. Belcher, Melbourne; Albert D. Darby, Jr., Valkaria; Lamar G. McBryde, Palm Bay, all of Fla.

[73] Assignee: Harris Corp., Melbourne, Fla.

[21] Appl. No.: 315,348

[22] Filed: Sep. 30, 1994

[51] Int. Cl.⁶ .................................................. G08C 21/00
[52] U.S. Cl. .................... 340/825.54; 340/825.49
[58] Field of Search ...................... 340/572, 573, 340/568, 531, 539, 825.49, 825.54, 825.31, 825.32, 825.69, 825.72, 941; 375/283, 258, 271; 342/419, 458

[56] References Cited

U.S. PATENT DOCUMENTS

| | | | |
|---|---|---|---|
| 5,235,326 | 8/1993 | Beigel et al. | 340/825.54 |
| 5,257,011 | 10/1993 | Beigel | 340/572 |
| 5,317,309 | 5/1994 | Vercellotti et al. | 340/825.54 |
| 5,451,941 | 9/1995 | Lamazou et al. | 340/572 |

*Primary Examiner*—Wellington Chin
*Assistant Examiner*—Jean B. Corrielus
*Attorney, Agent, or Firm*—Rogers & Killeen

[57] ABSTRACT

A method and system for determining whether a transmitting unit is proximate a receiving unit wherein the transmitting unit includes a magnetic field generator for a providing a plurality of time-sequential magnetic fields, each of the sequences being a differential phase shift key (DPSK) modulated code. The magnetic field is transmitted at a relatively interference free frequency of 72 KHz and the DPSK modulation frequency is about 1200 bits per second. Each pair of transmitting and receiving unit uses with a distinguishing code selected from a predetermined group of generally orthogonal codes.

20 Claims, 2 Drawing Sheets

PROXIMITY DETECTION USING DPSK WAVEFORM

BACKGROUND OF THE INVENTION

This application is related to and incorporates by reference copending applications Ser. No. 055,166 titled "Proximity Detector Employing Sequentially Generated Mutually Orthogonally Polarized Magnetic Fields", and Ser. No. 055,164 titled "Proximity Monitoring Apparatus Employing Encoded, Sequentially Generated, Mutually Orthogonally Polarized Magnetic Fields" both filed Apr. 30, 1993, both assigned to the assignee hereof, and both by the same inventor, Donald K. Belcher, one of the inventors hereof.

The present invention is directed to devices and methods for determining the proximity of a radio transmitter, and more particularly to a device and method for determining the proximity of a radio transmitter to a radio receiver that has a sharp, repeatable threshold of detection in diverse electromagnetic environments.

Proximity detection devices are used in a wide variety of applications for determining the relative nearness or separation of an object or person relative to another object or person. An application of such devices that has recently acquired considerable public interest involves using such devices to allow a responsible individual, such as a parent or guardian, to monitor the whereabouts of another person, such as a child, in the custody of the responsible individual. Typically, proximity monitoring is performed by equipping each of a parent and child with a respective radio transmitter/radio receiver pair. The radio transmitter carried by the child radiates a radio frequency (RF) electromagnetic signal to which the radio receiver in the unit carried by the parent is tuned. Should the level of a received electromagnetic signal monitored by the parent's receiver drop below a prescribed threshold, indicating that the child has moved beyond a prescribed distance from the parent, an alarm signal is generated by the parent's device.

Such devices have various drawbacks, not the least of which is that electromagnetic radio wave transmissions are subject to multipath propagation, which can be especially severe in the interior of a building. A further problem is the effect of dielectric distortion of the human body on the signal, which can cause a fluctuation in the signal amplitude on the order of 10–15 dB. Moreover, since the strength of a radiated electromagnetic signal is inversely proportional to the square of the distance from the emitter, the setting of a signal strength threshold to trigger an alarm yields very imprecise results, especially when considering the other effects described above.

These problems are addressed, in part, by the above-described copending applications. Those applications describe a magnetic field-based system in which a plurality of relatively low frequency (tens to hundreds of kilohertz) magnetic fields, having mutually orthogonal polarizations, are used. The magnetic fields are generated in a time sequence that is modulated by a prescribed encoding pattern, so as to give each pair of transmitter and receiver a unique identity and permit multiple systems to be used in the same operating environment without mutual interference. The magnetic field-based proximity detector system includes a magnetic field generator which is provided within a first device, as may be carried by an object, animal, or person whose whereabouts is being monitored. The magnetic field generator sequentially generates a plurality of magnetic fields of respectively different magnetic field polarizations. The magnetic field generator sequentially generates three time-varying magnetic fields, each having respective field polarizations that are mutually orthogonal to one another, so that complete coverage, without nulls, is provided for a three dimensional space coordinate system.

A magnetic field sensor is provided within a second device carried by another individual such as a parent or guardian monitoring the whereabouts of the animal, object, or person carrying the first device. The magnetic field sensor detects magnetic field energy associated with one or more of the encoded magnetic fields sequentially generated by the magnetic field generator carried by the monitored individual. The magnetic field sensor unit preferably includes one or more magnetic field sensors having respective magnetic field polarization sensitivities that are oriented mutually orthogonal with respect to each other. The outputs of the magnetic field sensors are coupled to respective decoder circuits that compare received sensor signals with a stored code pattern corresponding to that employed by the first device. Whenever the coded contents of the received signals match the stored code, a hit is declared by the decoder circuit associated with each respective magnetic field polarization channel. The output from each decoder is coupled to a timeout circuit, which monitors the rate at which it is receiving hits from the outputs of any of the decoders. As long as a hit is received from any decoder within a prescribed time interval, a determination is made that the monitored object is within the proximity of the monitoring individual. However, if the monitored object goes out of range, none of the magnetic field sensors will detect sufficient energy to permit a code match hit to be declared. When the timeout circuit receives no hit within the required time interval, it generates an output signal indicating that the first device is no longer in the proximity of the second device.

Magnetic fields provide the advantage that their power density with respect to distance has a very emphatic inverse proportionality characteristic, namely, it is inversely proportional to the sixth power of the distance. Accordingly, the slope of the magnetic field signal strength variation is extremely steep over the major portion of the working range of the receiver, thereby allowing an out-of-range threshold to be readily and accurately established. In addition, a magnetic field does not radiate in the manner of a radio frequency electromagnetic wave, therefore the previously described problems of multi-path propagation and human body dielectric distortion are not present.

However, even the elegant use of the magnetic field described above does not adequately address the problem of providing such a system in a low cost and energy efficient manner. For example, it is desirable that the time sequences of generated magnetic waves be modulated and subsequently demodulated in a simple system. Further, it is desirable that the system consume low levels of energy.

The generation of the magnetic field with a frequency within the range of tens to hundreds of kilohertz presents further problems in that there are a number of sources of potentially interfering radiation in this range. For example, incidental fields emanate from consumer devices such as televisions and personal computers, the government operates a chain of high-powered transmitters at 100 Khz to support LORAN, and televisions operate with a horizontal scan oscillator operating at 15,750 Hz with harmonics of the signals being quite severe.

Further, the codes used by each pair of transmitter and receiver may contain a number of similar sequences so that missed portions of the code may lead to misidentification. Accordingly, fit is desirable to provide a group of codes that have a high degree of orthogonality between codes and time-skewed versions of different codes (that is, the group of codes that includes codes that are not likely to be confused with each other).

Accordingly, it is an object of the present invention to provide a novel system and method of determining whether a first device is approximate a second device that obviates the problems of the prior art.

It is another object of the present invention to provide a novel device and method for determining whether a first device is approximate a second device that uses a plurality of time-sequential magnetic fields that are differential phase shift key (DPSK) modulated codes. DPSK modulation provides the advantages of simplified demodulation circuitry and the absence of the need for gain control in the receiving unit.

It is yet another object of the present invention to provide a novel device and method of determining whether a first device is approximate a second device in which a magnetic field is transmitted at a frequency that obviates interference from known sources of radiation.

It is another object of the present invention to provide a novel method and device of determining whether a first device is approximate a second device in which a magnetic field is DPSK modulated in a code selected from a predetermined group of generally orthogonal codes.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

While the use of a magnetic field to determine whether a first device is proximate a second device provides significant advantages over the use of electromagnetic waves, the magnetic field desirably has properties that make it amenable to use in low cost systems that are to be operated in high noise environments in proximity to other such systems.

To enable operation in high noise environments, the magnetic field may be transmitted on a carrier frequency of about 72 KHz. This frequency is free of known sources of radiation and falls between the fourth and fifth harmonic of a television oscillator.

To reduce the cost of the system, the magnetic field may be modulated using differential phase shift key (DPSK) modulation. DPSK modulation provides several advantages, including demodulation circuitry that is very simple, and the absence of a requirement for gain control in the receiving unit. DPSK modulation also provides the advantage of having a high energy level per bit since the carrier is always on, so that operation in high noise environments is facilitated. The modulation rate is desirably consistent with the desired signalling rate and may be about 1200 bits per second.

To allow interference-free operation in the proximity of other proximity detection systems, each pair of receiver and transmitter is provided with a distinguishing code (a series of bits) that is generally orthogonal to codes used by other systems. By providing the pairs of transmitters and receivers with codes that are selected from a predetermined group of generally orthogonal codes, the likelihood that proximate pairs will interfere is reduced from pairs of codes that may be randomly entered with conventional hand-set dip switches.

Figure 1:
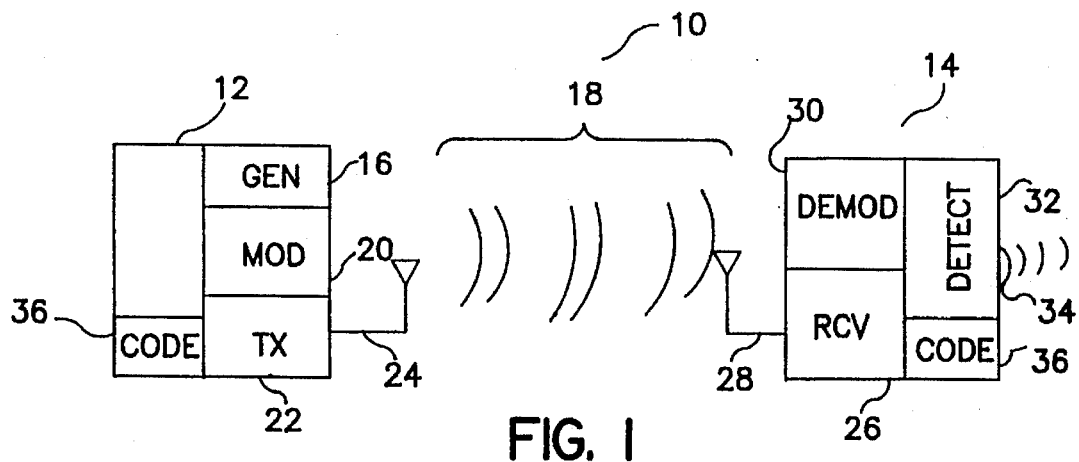
FIG. 1 is a block diagram of an embodiment of the system of the present invention.

With reference now to FIG. 1, an embodiment 10 of a system of the present invention may include a transmitting unit 12 and a receiving unit 14. The transmitting unit 12 may be carried by an object, animal, or person whose location is to be monitored, and the receiving unit 14 may be carried by a person responsible for monitoring the location of the object, animal, or person. The transmitting unit 12 may include one or more magnetic field generators 16, each for providing a plurality of magnetic fields 18 in a coded sequence. The magnetic fields may be DPSK modulated by a modulator 20 at a frequency of about 1200 bits per second. The DPSK modulated magnetic fields may be transmitted by transmitter 22 via antenna 24 on a frequency that is free of other sources of radiation, such as 72 KHz.

The receiving unit 14 may include a magnetic field receiver 26 and antenna 28 for receiving the magnetic fields at the frequency of the transmitter 22. The received magnetic fields may be demodulated in demodulator 30. A detection unit 32 may determine whether a predetermined number of the magnetic field sequences have been received in a predetermined period of time, and provide an alarm signal 34 to the person carrying the receiving unit 14 in the event the requisite number of sequences are not received.

Each pair of transmitting and receiving units 12 and 14 may be provided with a code selected from a group of codes designed to be highly orthogonal to other codes in the group. The group of codes may be permanently or adjustably installed in stores 36. Each code may be a series of bits, and is desirably about ten bits in length to provide reasonably distinguishable codes. The group of codes from which the code for each pair is selected desirably includes twenty or more codes to assure a high degree of orthogonality, although as few as ten codes provide reasonably acceptable distinctiveness. The recommended group of twenty codes is (hereinafter referred to a "Darby codes"):

| Code Number | Code | Hex Code |
|---|---|---|
| 1 | 0000110111 | 037 |
| 2 | 0001011111 | 05F |
| 3 | 0001111001 | 079 |
| 4 | 0010101101 | 0AD |
| 5 | 0011001101 | 0CD |
| 6 | 0011010101 | 0D5 |
| 7 | 0011101011 | 0EB |
| 8 | 0011111100 | 0FC |
| 9 | 0100101101 | 12D |
| 10 | 0101010101 | 155 |
| 11 | 0101100011 | 163 |
| 12 | 0110110010 | 1B2 |
| 13 | 1001110010 | 272 |
| 14 | 1010010011 | 293 |
| 15 | 1011100001 | 2E1 |
| 16 | 1101000110 | 346 |
| 17 | 1101010011 | 353 |
| 18 | 1101101111 | 36F |
| 19 | 1110001010 | 38A |
| 20 | 1111101110 | 3EE |

The maximum cross correlation of the Darby codes is 8.0 and the average maximum cross correlation is 7.05. The minimum number of 1's is five, and the maximum number of 1's is eight.

Figure 2:
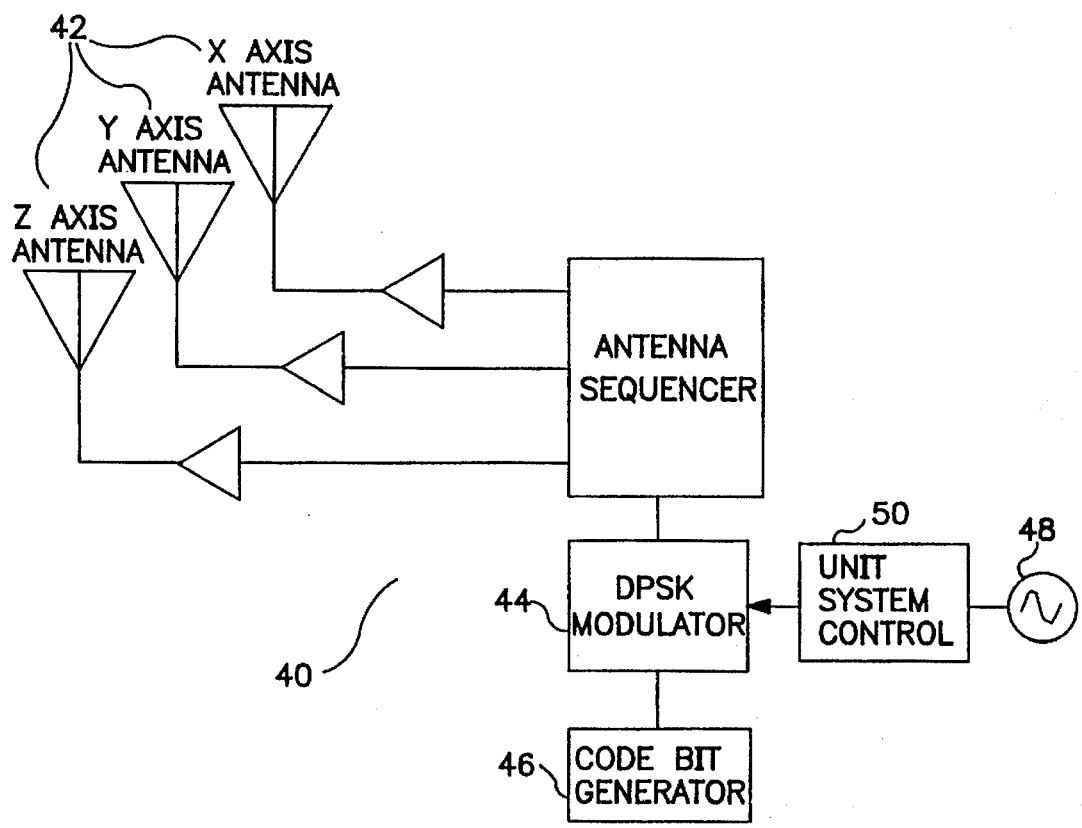
FIG. 2 is a block diagram of an embodiment of a magnetic field transmitter of the present invention.

With reference now to FIG. 2, a preferred embodiment of a transmitting unit 40 that is carried by the object, animal, or person whose location is being monitored may include three antennas 42 for providing mutually orthogonal magnetic fields that are each DPSK modulated by modulator 44 and encoded by code generator 46 with the same Darby code. The code generator 46 provides a coded ten bit, 1.2 KHz signal to DPSK modulator 44 where it is modulated onto a 72 KHz carrier from source 48 under the control of controller 50 and provided to the antennas 42. The three antenna are each driven 3,125 times per second (every 320 msec) in X Y Z order. The transmission duration on each axis is 9.2 ms for a total duty cycle of 8.6%.

Figure 3:
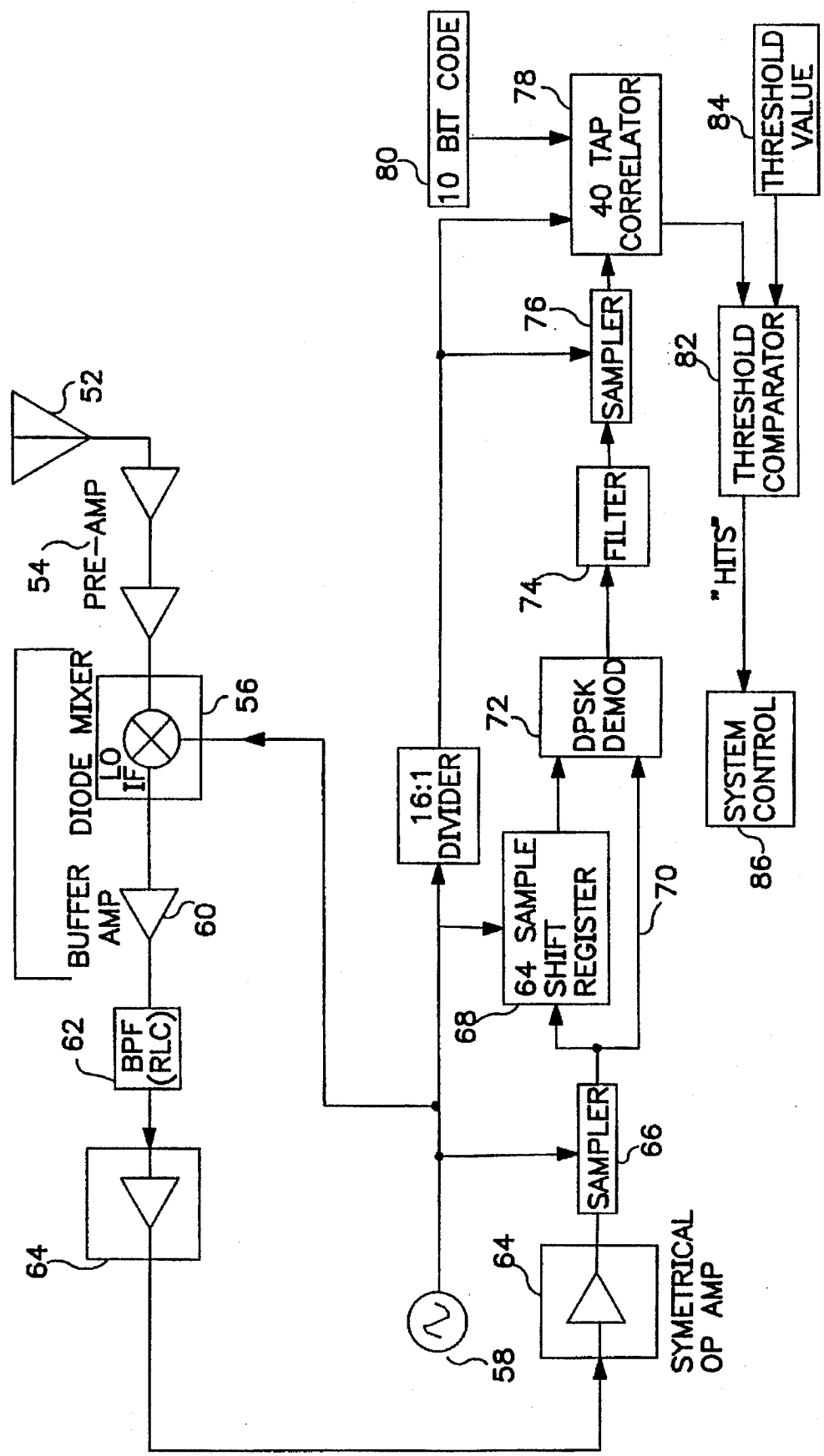
FIG. 3 is a block diagram of an embodiment of a magnetic field receiver of the present invention.

With reference now to FIG. 3, an embodiment of the receiver unit includes an antenna 52 tuned to the 72 KHz transmitting unit frequency (plural antennas may be provided, although this is not required.) The output of the antenna 52 is amplified in pre-amplifiers 54 and sampled with a diode sampling bridge 56. The sampled rate is 76.8 KHz (provided by clock 58) and the sampling bridge 56 pulse width is 1.2 μsec. The sampling bridge 56 aliases the input signal down to 4.8 KHz (72–76.8 KHz). The samples are amplified in buffer amplifier 60 and bandpass filtered in filter 62. The filter 62 has a center frequency of 4.8 KHz and a bandwidth of about 3 KHz. The filtered input is limited by symmetrical operational amplifiers 64 and resampled in one bit samples by a sampler 66, using the clock input from clock 58.

The one bit samples are non-coherently DPSK demodulated by delaying the samples one bit time (64 clocks) in shift register 68, and by multiplying the delayed samples by non-delayed samples 70 in a DPSK demodulator 72. Since the delay is four cycles of the intermediate 4.8 KHz frequency, the samples that are multiplied are coherent in phase. Each bit is used as an inphase base for the next bit to detect the 0° or 180° phase shift indicating no-transition or transitions in the data.

The output of the DPSK demodulator 72 is low pass filtered in filter 74, that is a digital decimate-by-16, integrate-and-dump filter with a $(\sin(x))/x$ response and a first null at about 4.8 KHz. The products are attenuated an additional 13 dB before being aliased down to direct current by decimation in sampler 76. At this point, the baseband DPSK demodulated data is hard limited and oversampled by a factor of four.

The oversampled data from sampler 76 are correlated in 40 tap correlator 78 against a similarly four times oversampled reference that provides the one of the Darby codes 80 that had previously been entered. The correlator output ranges from 0 to 40 with an average of about 20. The correlator 78 output is compared in comparator 82 to a predetermined threshold 84. When the correlator 78 output exceeds the threshold 84, a "hit" is declared to a system controller 86. The controller 86 keeps track of time and hits and provides an alarm when a predetermined number of "hits" are not received within a predetermined period of time, or when a "hit" is not received within a predetermined time window.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. A system for determining whether a first device is proximate a second device, said first device comprising a magnetic field generator for providing a plurality of time-sequential magnetic fields, said plurality of fields comprising a differential phase shift key (DPSK) modulated code; and said second device comprising means for determining whether a predetermined number of repetitions of said code have been received within a predetermined period of time.

2. The system of claim 1 wherein said first device comprises a DPSK modulator for modulating said magnetic fields at a rate of about 1200 bits per second.

3. The system of claim 1 wherein said first device comprises a transmitter for transmitting said magnetic fields at a frequency of about 72 KHz.

4. The system of claim 1 wherein said second device comprises a receiver for receiving said magnetic fields at a frequency of about 72 KHz.

5. The system of claim 1 wherein said second device comprises a DPSK demodulator for demodulating said magnetic fields.

6. The system of claim 1 wherein each said code comprises a series of ten bits.

7. The system of claim 1 wherein said code is selected from a predetermined group of generally orthogonal codes.

8. The system of claim 7 wherein said group of generally orthogonal codes comprises:

| Code Number | Code |
|---|---|
| 1 | 0000110111 |
| 2 | 0001011111 |
| 3 | 0001111001 |
| 4 | 0010101101 |
| 5 | 0011001101 |
| 6 | 0011010101 |
| 7 | 0011101011 |
| 8 | 0011111100 |
| 9 | 0100101101 |
| 10 | 0101010101. |

9. The system of claim 8 wherein said group of generally orthogonal codes further comprises:

| Code Number | Code |
|---|---|
| 11 | 0101100011 |
| 12 | 0110110010 |
| 13 | 1001110010 |
| 14 | 1010010011 |
| 15 | 1011100001 |
| 16 | 1101000110 |
| 17 | 1101010011 |
| 18 | 1101101111 |
| 19 | 1110001010 |
| 20 | 1111101110. |

10. The system of claim 1 wherein said second device further comprises means for providing an alarm when less than the predetermined number of said code repetitions have been received within the predetermined period of time.

11. The system of claim 1 wherein said first device is carried by one of the members of the group consisting of an animal, person and object, so that the proximate location of the member of the group relative to the second device may be determined.

12. A method of determining whether a first device is proximate a second device, the method comprising the steps of:

(a) generating plural time-sequential magnetic fields at the first device;

(b) differential phase shift key (DPSK) modulating the time-sequential magnetic fields in a code comprising a series of bits;

(c) transmitting said coded time-sequential magnetic fields from said first device repeatedly; and (d) determining whether a predetermined number of the coded time-sequential magnetic fields have been received at the second device in a predetermined period of time.

13. The method of claim 12 wherein the DPSK modulation is at a rate of about 1200 bits per second.

14. The method of claim 12 wherein the magnetic fields are transmitted at a frequency of about 72 KHz.

15. The method of claim 12 wherein each code comprises a series of ten bits.

16. The method of claim 12 further comprising the step of selecting the code from a predetermined group of generally orthogonal codes.

17. The method of claim 16 wherein the group of generally orthogonal codes comprises:

| Code Number | Code |
|---|---|
| 1 | 0000110111 |
| 2 | 0001011111 |
| 3 | 0001111001 |
| 4 | 0010101101 |
| 5 | 0011001101 |
| 6 | 0011010101 |
| 7 | 0011101011 |
| 8 | 0011111100 |
| 9 | 0100101101 |
| 10 | 0101010101. |

18. The method of claim 15 wherein the group of generally orthogonal codes further comprises:

| Code Number | Code |
|---|---|
| 11 | 0101100011 |
| 12 | 0110110010 |
| 13 | 1001110010 |
| 14 | 1010010011 |
| 15 | 1011100001 |
| 16 | 1101000110 |
| 17 | 1101010011 |
| 18 | 1101101111 |
| 19 | 1110001010 |
| 20 | 1111101110. |

19. The method of claim 10 further comprising the step of providing an alarm when less than the predetermined number of said coded time-sequential magnetic fields have been received at the second device within the predetermined period of time.

20. In a method of determining whether a first device is proximate to a second device, the improvement comprising the steps of:

(a) repeatedly transmitting a multi-bit code via a sequence of differential phase shift key (DPSK) modulated magnetic fields from the first device to the second device; and (b) determining if less than a predetermined number of repetitions of the code are received at the second device in a predetermined period of time.

* * * * *